United States Patent [19]

Abe et al.

[11] Patent Number: 4,582,864

[45] Date of Patent: Apr. 15, 1986

[54] CARBONACEOUS FILLER-CONTAINING VINYLIDENE FLUORIDE RESIN COMPOSITION

[75] Inventors: Keizo Abe; Michiya Okamura; Takahiro Ozu; Hiroshi Yui; Masayoshi Tujii, all of Mie, Japan

[73] Assignee: Mitsubishi Petrochemical Co., Ltd., Tokyo, Japan

[21] Appl. No.: 697,466

[22] Filed: Feb. 1, 1985

[30] Foreign Application Priority Data

Feb. 10, 1984 [JP] Japan ................................. 59-24186

[51] Int. Cl.$^4$ .............................................. C08K 3/04
[52] U.S. Cl. .................................. 523/220; 524/496; 524/545
[58] Field of Search ................ 523/220; 524/495, 496, 524/545

[56] References Cited

U.S. PATENT DOCUMENTS

| | | | |
|---|---|---|---|
| 4,107,356 | 8/1978 | Ukihashi et al. | 523/220 |
| 4,328,151 | 5/1982 | Robinson | 524/545 |
| 4,339,322 | 7/1982 | Balko et al. | 204/255 |

*Primary Examiner*—Herbert J. Lilling
*Attorney, Agent, or Firm*—Oblon, Fisher, Spivak, McClelland & Maier

[57] ABSTRACT

A vinylidene fluoride resin composition is disclosed, comprising a vinylidene fluoride resin, a carbon fiber and a specific granular graphite. The composition can provide a molded article having improved surface evenness and gloss by preventing the sink mark and warpage on the surface thereof.

10 Claims, No Drawings

CARBONACEOUS FILLER-CONTAINING VINYLIDENE FLUORIDE RESIN COMPOSITION

FIELD OF THE INVENTION

The present invention relates to a vinylidene fluoride resin composition which can provide a molded article having the improved surface evenness and gloss by suppressing the sink mark and warpage on the surface thereof.

BACKGROUND OF THE INVENTION

A vinylidene fluoride resin has excellent resistance to chemicals, resistance to oils, mechanical strength and durability, and can be easily processed by thermoforming. As a result, the vinylidene fluoride resin has been conventionally used in various parts in chemical industries such as valves, joints or pipes. In particular, in the anticorrosion field such as pump housings, gears or bearings, high size precision and mechanical strength of the molded articles as well as the anticorrision are indispensable. For those utilities, a method has been employed, comprising blending carbon fibers or graphite fibers with the vinylidene fluoride resin.

Such a method is effective to improve the mechanical strength of the molded article, but the sink mark and warpage occur in the molded article and the surface roughness and deterioration of gloss also occur. For instance, in the case of an injection molding, the orientation distribution occurs in the direction of resin flow and the anisotropy causes in the coefficient of mold shrinkage of the molded article, so that the warpage occurs on the surface of the molded article. As a result, the fitting in assembling the molded article and other parts cannot be conducted sufficiently. Further, the fibrous fillers are present in the vicinity of the surface of the molded article and as a result, sink mark, surface roughness and deterioration of gloss occur.

SUMMARY OF THE INVENTION

As a result of various investigations to overcome the disadvantages in the prior art without deteriorating the inherent merits of the vinylidene fluoride resin, it has been found that the carbon fiber has a good affinity for a specific granular graphite, the carbon fiber and graphite do not separate even under melting and flowing state of the resin composition in a metallic mold, and as a result, a molded article in which the carbon fiber and granular graphite are uniformly dispersed in the resin can be obtained.

Accordingly, an object of the present invention is to provide a vinylidene fluoride resin composition comprising 30 to 92% by weight of a vinylidene fluoride resin, 3 to 10% by weight of a carbon fiber and 5 to 60% by weight of a granular graphite wherein at least 20% by weight of the granular graphite has the particle diameter within the range of 5 to 50 $\mu$m.

The composition according to the present invention is effective to not only suppress the sink mark and warpage on the surface of the molded article and improve the surface evenness and gloss thereof, but also increase the mechanical strength of the molded article. Further, the composition can maintain the melt flowability (moldability). Therefore, the composition of the present invention can be suitably used in the product to which high qualities are required.

DETAILED DESCRIPTION OF THE INVENTION

The vinylidene fluoride resin which can be used in the present invention is a homopolymer of vinylidene fluoride or a copolymer of 50 mol % or more of vinylidene fluoride and a monomer copolymerizable therewith such as 4-fluoroethylene, 6-fluoroethylene, 3-fluoropropylene, etc.

Of those resins, resins having an apparent melt viscosity (measured at a temperature of 230° C. and a shear rate of 100 sec$^{-1}$) of 5,000 to 40,000 are preferred.

A composition comprising 50% by weight or more of the above-described vinylidene fluoride resin and other thermoplastic resin can also be used as the vinylidene fluoride resin according to the present invention.

The vinylidene fluoride resin can be used in an amount of 30 to 92% by weight based on the weight of the composition.

The carbon fiber which can be used in the present invention can be the commercially available carbon fibers. The carbon fibers having a length of 5 mm or more are particularly preferred from the standpoints of the effect of the present invention and the tensile strength. The amount of the carbon fiber is from 3 to 10% by weight, preferably from 5 to 10% by weight, based on the weight of the composition.

If the amount of the carbon fiber is less than 3% by weight, the mechanical strength of the molded article is insufficient and if the amount thereof is more than 10% by weight, it is difficult to suppress the formation of warpage on the surface of the molded article.

The graphite which can be used in the present invention is the granular graphite wherein 20% by weight or more, preferably 30% by weight and most preferably 50% by weight of the granular graphite has the particle diameter within the range of 5 to 50 $\mu$m and preferably 10 to 40 $\mu$m. If the amount of the graphite having the particle diameter outside the above range is less than 20% by weight, the effect of the present invention cannot be exhibited and the effect of improving the modulus of elasticity of the molded article is poor.

The graphite can be used in an amount of 5 to 60% by weight and preferably 10 to 30% by weight based on the weight of the composition.

If the amount of the graphite is less than 5% by weight, the effects of improving the sink mark and warpage are poor and the effect of improving the mechanical strength of the molded article is also poor. If the amount thereof is more than 60% by weight, the tensile break strength of the molded article deteriorates and the melt flowability of the composition also deteriorates to cause the problem of "short shot".

The composition of the present invention can be obtained by mixing or kneading the above components in the conventional methods such as extruder, roll, Banbury mixer, etc. For example, the carbon fiber is added to the vinylidene fluoride resin together with the granular carbon and then the mixture is stirred to uniformly mix, or the carbon fiber and granular graphite are added to the solution or suspension of the vinylidene fluoride resin to uniformly disperse.

The present invention is not described in greater detail by reference to the following non-limiting examples and comparative examples.

EXAMPLES AND COMPARATIVE EXAMPLES

To the vinylidene fluoride resin ("KYNAR", product of Pennwalt Co.) were added the components as shown in the Table below. The resulting mixture was pelletized using an extruder and then subjected to injection molding to prepare a test piece. The test piece of each example was one that the carbon fiber and the graphite were uniformly dispersed therein without separation and local existence.

The test piece was evaluated in the following methods.
(1) Moldability: JIS-K7210
(2) Tensile break strength: JIS-K7113
(3) Bending modulus of elasticity: JIS-K7203
(4) Gloss: JIS-Z8741
(5) Sink mark: Visually evaluated
(6) Warpage: Visually evaluated
(7) Surface roughness: Visually evaluated
(8) Coefficient of mold shrinkage: ASTM-D955
(9) Anticorrosion: A test piece was immersed in a 50 wt % aqueous sodium hydroxide solution or 98 wt % concentrated sulfuric acid at 60° C. for 1 month. The tensile strength of the test piece was measured according to JIS-K7113 and the surface appearance of the test piece was visually evaluated.

The results obtained are shown in the Table below.

The results shown in the above Table clearly shows that the test pieces prepared from the composition according to the present invention show good evaluation in various evaluation items as compared to the test pieces obtained from the composition outside the present invention.

While the invention has been described in detail and with reference to specific embodiment thereof, it will be apparent to one skilled in the art that various changes and modifications can be made therein without departing from the spirit and scope thereof.

What is claimed is:

1. A vinylidene fluoride resin composition comprising 60 to 92% by weight of a vinylidene fluoride resin, 3 to 10% by weight of a carbon fiber and 5 to 30% by weight of granular graphite wherein at least 20% by weight of the granular graphite has the particle diameter within the range of 5 to 50 μm.

2. The vinylidene fluoride resin composition of claim 1, wherein the vinylidene fluoride resin is selected from the group consisting of a homopolymer of vinylidene fluoride and a copolymer comprising 50 mol % or more of vinylidene fluoride and a monomer copolymerizable therewith.

3. The vinylidene fluoride resin composition of claim 1, wherein the vinylidene fluoride resin has an apparent melt viscosity of 5,000 to 40,000 poises, measured at a temperature of 230° C. and a shear rate of 100 sec$^{-1}$.

4. The vinylidene fluoride resin composition of claim 1, wherein the carbon fiber has a length of 5 mm or more.

TABLE

| | Resin (wt %) | Carbon Fiber | | Graphite | | Moldability (Melt flow rate) (g/10 min) | Mechanical Strength | |
|---|---|---|---|---|---|---|---|---|
| | | Length (mm) | Amount (wt %) | Particle Diameter Distribution | Amount (wt %) | | Tensile Break Strength (kg/cm$^2$) | Bending Modulus of Elasticity (kg/cm$^2$) |
| Example 1 | 60 | 15 | 10 | 10–50 50 wt % | 30 | 1.5 | 650 | 85,000 |
| Example 2 | 82 | ↓ | 3 | ↓ | 15 | 2.5 | 600 | 52,000 |
| Comparative Example 1 | 65 | ↓ | 20 | ↓ | 15 | 0.5 | 660 | 86,000 |
| Comparative Example 2 | 84 | ↓ | 1 | ↓ | 15 | 1.6 | 390 | 58,000 |
| Comparative Example 3 | 15 | ↓ | 10 | ↓ | 75 | 0.2 | 430 | 42,000 |
| Comparative Example 4 | 88 | ↓ | 10 | ↓ | 2 | 3.5 | 470 | 31,000 |
| Comparative Example 5 | 60 | ↓ | 10 | 3μ or less 70 wt % | 30 | 1.5 | 480 | 23,000 |
| Comparative Example 6 | 100 | — | — | — | — | 4.0 | 420 | 15,000 |

| | Appearance | | | | Coefficient of mold shrinkage (*MD/TD) (%) | Sodium hydroxide solution immersion | | Conc. sulfuric acid immersion | |
|---|---|---|---|---|---|---|---|---|---|
| | Gloss | Sink Mark | Warpage | Roughness | | Tensile Strength (kg/cm$^2$) | Appearance (Cracks etc.) | Tensile Strength | Appearance (Cracks, etc.) |
| Example 1 | Good | Not observed | Not observed | Not observed | 1.1/1.1 | 650 | No change | 653 | No change |
| Example 2 | Good | ↓ | Not observed | Not observed | 1.3/1.3 | 598 | No change | 602 | No change |
| Comparative Example 1 | Good | ↓ | Observed | Observed (remarkable) | 0.8/1.1 | — | — | — | — |
| Comparative Example 2 | Good | ↓ | Not observed | Not observed | 1.9/1.8 | — | — | — | — |
| Comparative Example 3 | Good | ↓ | Not observed | ↓ | 0.6/0.6 | — | — | — | — |
| Comparative Example 4 | Bad | ↓ | Observed | ↓ | 1.8/2.5 | — | — | — | — |
| Comparative Example 5 | Good | ↓ | Not observed | ↓ | 1.5/1.8 | — | — | — | — |
| Comparative Example 6 | Bad | Observed (remarkable) | Not observed | ↓ | 3.0/2.8 | 415 | No change | 423 | No change |

*Molding Direction/Traverse Direction

5. The vinylidene fluoride resin composition of claim 1, wherein the amount of the carbon fiber is 5 to 10% by weight.

6. The vinylidene fluoride resin composition of claim 1, wherein the amount of the graphite is 10 to 30% by weight.

7. The vinylidene fluoride resin composition of claim 1, wherein 30% by weight or more of the graphite has a particle diameter within the range of 5 to 50 μm.

8. The vinylidene fluoride resin composition of claim 1, wherein 30% by weight or more of the graphite has a particle diameter within the range of 10 to 40 μm.

9. The vinylidene fluoride resin composition of claim 1, wherein 50% by weight or more of the graphite has a particle diameter within the range of 5 to 50 μm.

10. The vinylidene fluoride resin composition of claim 1, wherein 50% by weight or more of the graphite has a particle diameter within the range of 10 to 40 μm.

* * * * *